Feb. 2, 1971 TADAO MORITA 3,560,932
AUTOMATIC TICKET EXAMINING SYSTEM AND GATE CONTROL SYSTEM
Filed Sept. 19, 1968 7 Sheets-Sheet 1
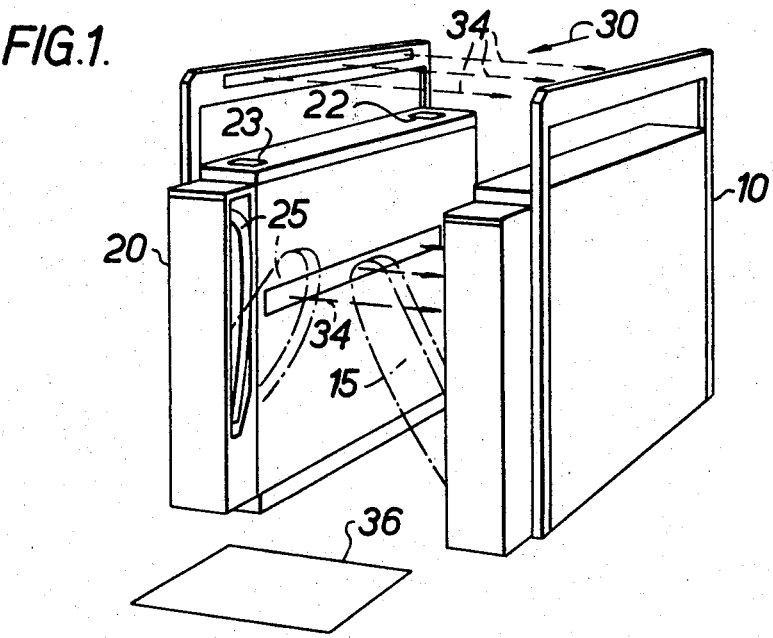

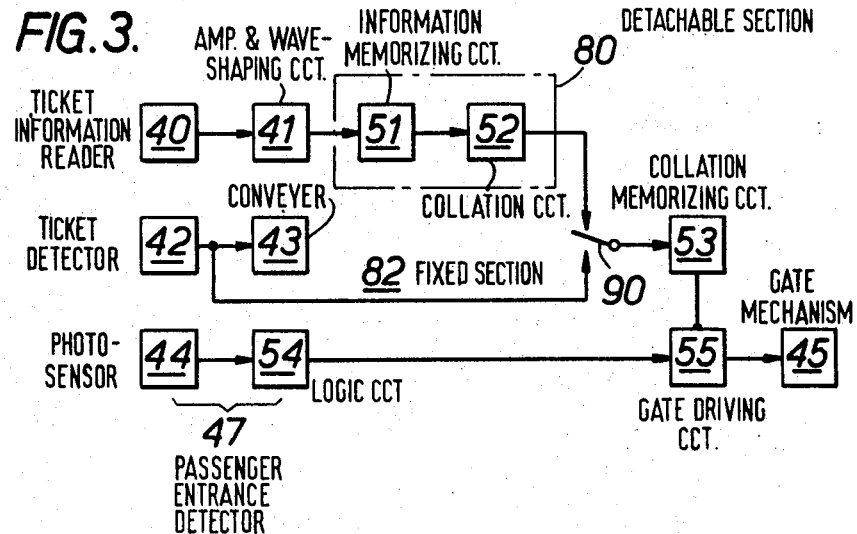
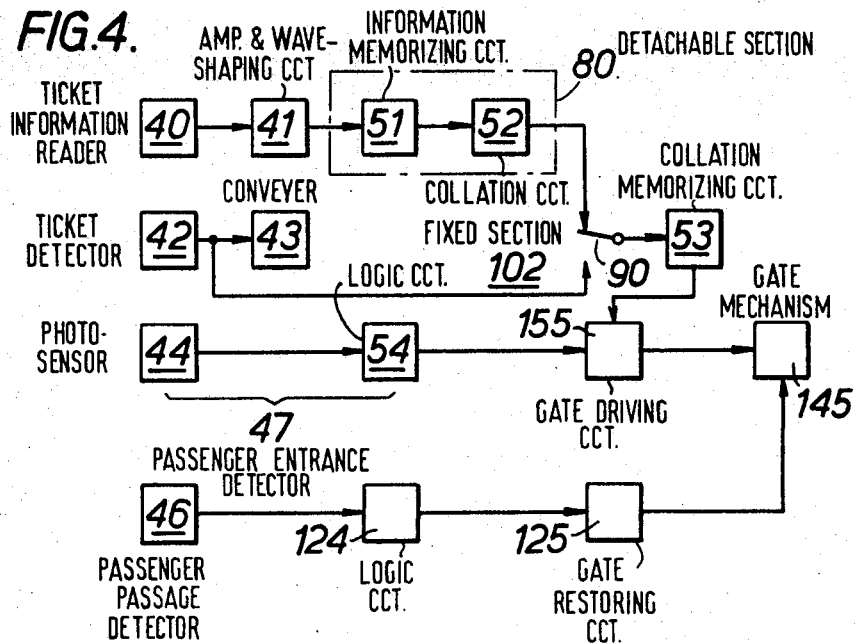

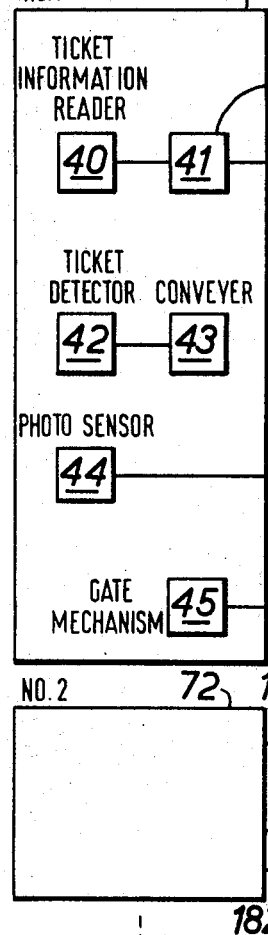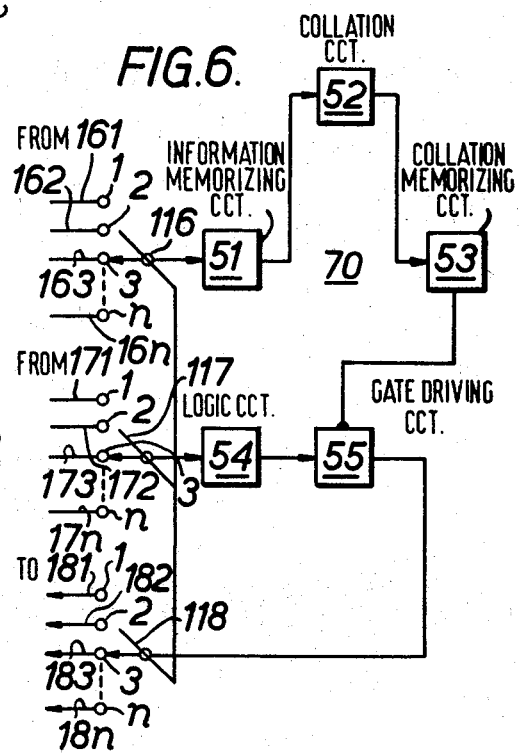

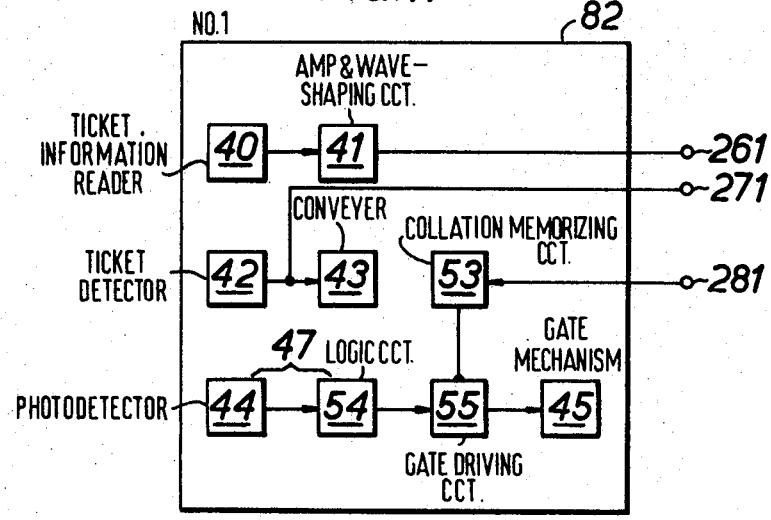
FIG. 7.
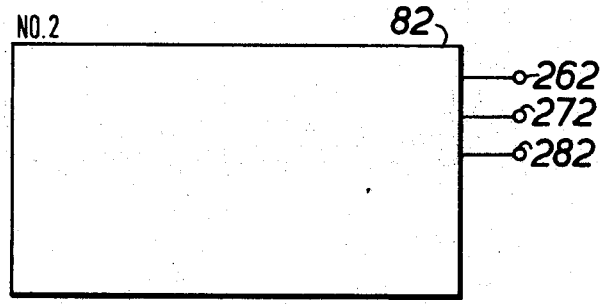
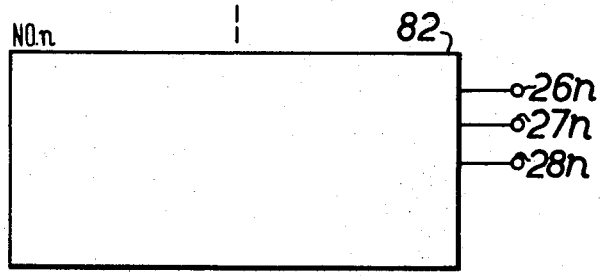

United States Patent Office 3,560,932
Patented Feb. 2, 1971

3,560,932
AUTOMATIC TICKET EXAMINING SYSTEM AND GATE CONTROL SYSTEM
Tadao Morita, Kyoto, Japan, assignor to Omron Tateisi Electronics Co., Kyoto, Japan, a company of Japan
Filed Sept. 19, 1968, Ser. No. 760,916
Claims priority, application Japan, Sept. 29, 1967, 42/62,780
Int. Cl. H04q 9/00
U.S. Cl. 340—149          11 Claims

ABSTRACT OF THE DISCLOSURE

An automatic ticket examining system comprising a plurality of ticket gates, wherein a selected one or more of the gates perform all the functions of a complete ticket gate, that is, receiving a ticket, checking its validity, opening or closing the gateway depending upon the validity or invalidity of the ticket and returning or collecting the ticket, while the other ticket gates perform only those functions which make them look as if they were operating as a complete ticket gate. The component parts required to make a complete automatic ticket gate are divided into two complementary groups or sections, that is, a fixed section and a detachable section. Each of the gates included in the system of the invention has a fixed section, and a single detachable section is provided for common selective use in all the gates. The detachable section may be mounted or otherwise associated with a desired one of the ticket gates so as to cause only that one ticket gate to work as a complete ticket gate, while leaving the other ticket gates in the system performing only those functions which make them look as if they were complete ticket gates.

---

This invention relates to a system for automatically examining railway tickets or the like, and more particularly to an automatic ticket examining system which includes a plurality of ticket gates.

Automatic ticket gates are generally so designed as to examine the tickets passengers put in the gates with respect to its validity and open or close the gateway depending upon the validity or invalidity of the tickets. Such ticket gates must be provided with various means, such as means for reading the information recorded on the ticket inserted into the gate, means for checking the validity of the ticket information read by the reading means, means for controlling the opening and closing of the gate in accordance with the result of the checking, and various others. On the other hand, to increase the passage efficiency, it is desirable to provide as many ticket gates as possible. If all the ticket gates provided must have all those component parts as mentioned above, the cost involved would amount to a great deal. Moreover, in automatic ticket gates, the information set therein concerning the date and the period of availability, etc. must be changed daily, and it would require a lot of time and labor to change such information in all the ticket gates provided in the system.

Accordingly, it is the primary object of the invention to provide an automatic ticket examining system including a plurality of ticket gates, in which a selected one or more of the gates perform its proper function as a complete automatic ticket gate, whereas the other ticket gates perform only those functions which make them look as if they were operating as a perfect automatic ticket gate.

According to the invention, the component parts that are required to make a complete automatic ticket gate of a desired capability are divided into two complementary groups or sections, that is, a fixed section and a detachable section, and each of the ticket gates included in the system has a fixed section while a single detachable section is provided for common use with all the ticket gates.

In one embodiment of the invention, the detachable section is mounted on a selected one of the ticket gates so as to be combined with the fixed section therein to form a complete automatic ticket gate, while the other gates stand lacking the detachable section so that they do not perform all the functions necessary for a complete ticket gate, but only those functions which make them appear as if they were operating as a complete ticket gate.

In another embodiment of the invention, the detachable section is provided at a central station or the like away from the ticket gates in the system so that it may be manually or automatically connected to a selected one of the ticket gates to make that selected gate work as a complete ticket gate.

The fixed section includes means for reading the information recorded on the ticket used in the gate, and means for controlling the operation of the gate bars or the like, and the detachable section includes means for checking the validity of the ticket information read by the reading means. Thus, the gate in which the detachable section is mounted performs all the functions required of a complete ticket gate, that is, receiving a ticket, reading the information thereon, checking the validity of the ticket information, controlling the opening and closing of the gate bars depending upon the validity or invalidity of the ticket information, and returning the ticket to the passenger or collecting it. However, the other ticket gates which lack the detachable section perform only those functions which make them appear as if they were operating as a complete ticket gate. That is, they only receive a ticket, open the gate (or keep it open) and returning or collecting the ticket, and do not check the ticket with respect to its validity.

In what order the gates included in the system are successively caused to operate as a complete ticket gate and how long they remain so may be predetermined. The order may also be determined at random by comparatively rapidly changing the connection with the detachable section from one of the ticket gates to another successively and causing that ticket gate in which the connection with the detachable section happens to coincide with in-section of a ticket to operate as a complete ticket gate.

The invention will be better understood from the following detailed description of preferred embodiments thereof with reference to the accompanying drawings, wherein like reference numerals denote like parts, and wherein:

FIG. 1 is a perspective view of a ticket gate used in the system of the invention;

FIG. 2 is a block diagram of a control system for a normally open type of ticket gate, wherein the checking of passage of passengers is omitted;

FIG. 3 is a diagram similar to FIG. 2, but wherein the checking of passage of passengers is conducted;

FIG. 4 is a block diagram of a control system for a normally closed type of ticket gate, wherein the checking of passage of passengers is conducted;

FIGS. 5 and 6 are combined to show a whole ticket examining system in accordance with one embodiment of the invention, wherein the ticket gates are of a normally open type and the checking of passage of passengers is omitted, FIG. 5 showing the individual gates with a fixed section and FIG. 6 showing a central control including a single detachable section;

FIG. 7 is a block diagram similar to FIG. 5, but wherein the checking of passage of passengers is conducted.

Figure 8:
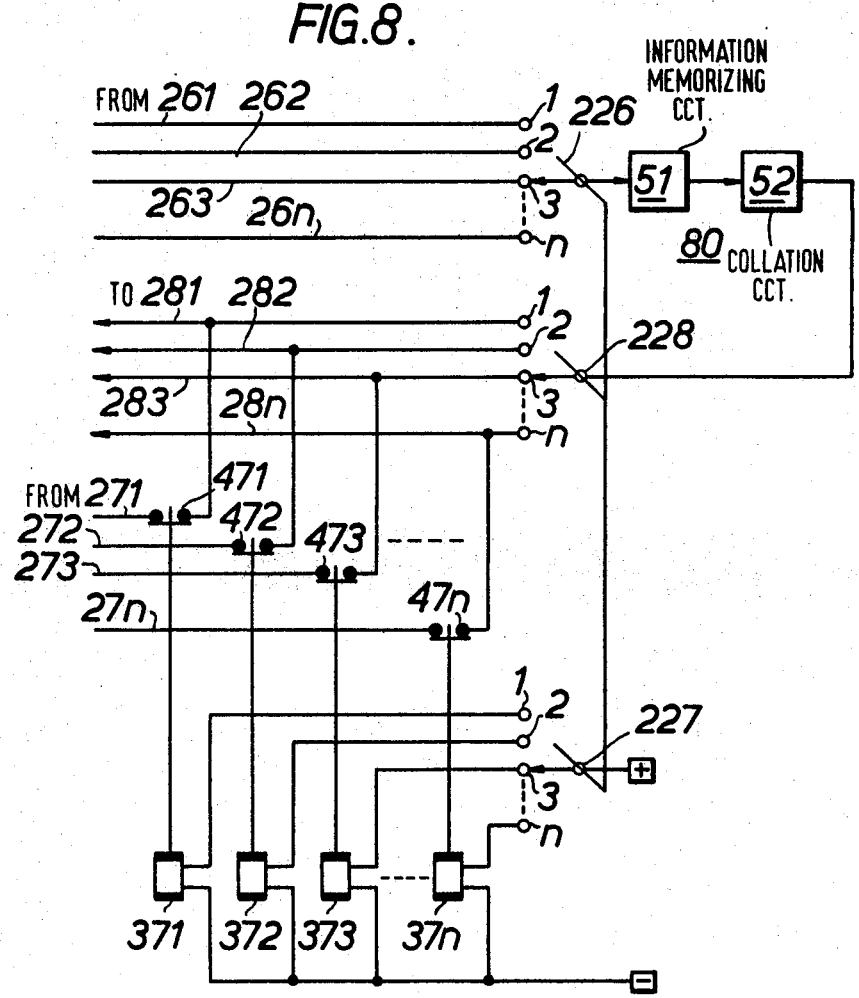
FIGS. 8-10 are block diagrams similar to FIG. 6 but showing different embodiments wherein the checking of passage of passengers is conducted.

Now referring to the drawings, first to FIG. 1, there is shown a ticket gate comprising a pair of elongated side structures 10 and 20 laterally spaced apart to define a gateway therebetween. Pasengers pass through the gateway in the direction of an arrow 30. As they enter the gateway, they insert their tickets into a slot 22 formed in one of the structures, say 20, and pick them up from another slot 23.

Inside the structure 20 a suitable conveying means, not shown, is provided to convey the tickets from the inlet slot 22 to the outlet slot 23. A suitable detector, not shown, is provided in the inlet slot 22 to detect the ticket inserted thereinto and provides a drive signal to run the ticket conveying means. While the ticket is being conveyed toward the outlet slot 23, a ticket information reader reads the information previously recorded on the ticket, such as the period of availability, the range of journey, etc! Light beams 34 cross the gateway so that when they are intercepted by a passenger, the passage of the passenger is detected in a well known manner.

The structures 10 and 20 are provided at the exit side of the gateway with a pair of gate bars 15 and 25 opposed across the gateway. The gate bars 15 and 25 are pivotable about their respective lower ends, so that when they are pivoted to project across the gateway, they block the gateway, and when they are retracted into the structures 10 and 20, the passenger is free to pass through the gateway.

If required, a plate 36 may be provided at the exit side of the gateway so that when it is stepped on by the passenger leaving the gate, a detector not shown is actuated to detect the passage of the passenger.

FIG. 2 shows a block diagram of a control for a normally open type of ticket gate. As is well known, this type of gate is such that the gate bars or the like normally keep the gate open and when the ticket inserted thereinto is found false or invalid, or when a passenger comes in without any ticket, the gate bars are closed in front of the passenger. The control system of FIG. 2 resuires no passenger detector of the stepping plate type as shown in FIG. 1. Such a passenger detector is required in a normally closed type, as will be described later.

In FIG. 2 the above-mentioned ticket detector is shown as a block 42. The output from the detector 42 is applied as a drive signal to a ticket conveyor 43. While the ticket is being conveyed toward the outlet slot, a ticket reader 40 reads the information on the ticket and converts it into a corresponding electrical signal. This signal is applied to a memorizing circuit 51 through an amplifying and wave-shaping circuit 41. The output from the memorizing circuit 51 is applied to a collation circuit 52 which comprises a portion in which a valid ticket information is memorized beforehand and a portion in which the output from the memorizing circuit 51, that is, the information read from the inserted ticket is collated with the valid information. If the ticket information is found valid, the collation circuit 52 produces an output, while if the ticket information is found invalid, the circuit 52 produces no output at all.

The output from the circuit 52 is applied to a collation memorizing circuit 53 which memorizes the result of the collation when the ticket is found valid, and produces a corresponding output.

The previously mentioned passenger entrance detector is shown as a block 47 which includes a photosensor 44 and a logic circuit 54. The output from the circuit 54 is applied to a gate driving circuit 55, to which the output from the memorizing circuit 53 is also applied as an inhibit signal. The output from the gate driving circuit 55 is applied to a gate mechanism 45.

Thus, when the ticket inserted into the inlet slot of the ticket gate has been found invalid or there is no ticket inserted thereinto, the memorizing circuit 53 produces no output, so that no inhibit signal is applied to the gate driving circuit 55. Under the condition, when a passenger enters the gateway, the passenger entrance detector 47 produces an output, which causes the gate driving circuit 55 to produce a drive signal to operate the gate mechanism 45, whereupon the gate bars 15 and 25 are projected across the gateway to block it. On the contrary, when the ticket inserted into the gate has been found valid, the gate bars are not driven so that the passenger can pass through the gate.

After the passenger has passed the gate, all the circuits in the system of FIG. 2 are reset before a succeeding passenger comes in. The reset signal may be obtained from the logic circuit 54.

The system of FIG. 2 is divided into two sections 70 and 72. The section 70 is surrounded by a dash-and-dot line and will be referred to as the detachable section, while the section 72, as the fixed section. The fixed section 72 comprises the ticket insertion detector 42, the ticket conveyor 43, the ticket information reader 40, the amplifying and wave-shaping circuit 41 and the photosensor 44 of the passenger entrance detector 47, while the detachable section 72 comprises the information memorizing circuit 51, the collation circuit 52, the collation memorizing circuit 53, the logic circuit 54 of the passenger entrance detector 47 and the gate driving circuit 55.

Each of a plurality of ticket gates installed at, say, a railway station includes one fixed section 72. The detachable section may be formed into a cartridge or something which can be selectively mounted onto any one of the ticket gates so as to be combined with the fixed section 70 provided therein, thereby to complete the system of FIG. 2. Then, that ticket gate can perform its proper function completely.

However, if the detachable section is dismounted from the ticket gate, it can no longer examine the ticket with respect to its validity but simply convey it onto the outlet slot, so that the ticket gate appears as if it were examining the ticket, thereby psychologically suppressing any attempts to make passage through the gate with a false ticket or without any ticket.

FIG. 3 shows a control system for a ticket gate of a normally open type similar to FIG. 2. In FIG. 2 the checking of passage of passengers is omitted, but in FIG. 3 the checking of passage of passengers is conducted. In other words, in FIG. 2 passengers can pass through the gate even without inserting any ticket, but in FIG. 3 passengers can pass through the gate if they insert a ticket into the gate regardless of the validity or invalidity of the ticket. Here, the detachable section 80 comprises a ticket information memorizing circuit 51 and a collation circuit 52, while the fixed section 82 includes a transfer switch 90 so that the output from the ticket insertion detector 42 and that from the collation circuit 52 are alternatively applied to the collation memorizing circuit 53.

When the detachable section 80 is mounted, the switch 90 is transferred to the side of the section 80, so that the ticket gate can perform its proper function completely. When the section 80 has been dismounted, however, the switch is changed over to the side of the ticket insertion detector 42 so that the gate operates as if it were a complete ticket gate. That is, the gate bars are always kept open and closed against only those passengers coming in without any ticket.

FIG. 4 shows a system similar to FIG. 3, but the gate here is of a normally closed type. In FIG. 4, when a passenger inserts his or her ticket into the inlet slot of the gate, a ticket detector 42 detects the ticket and a conveyer 43 is sarted to convey the ticket onto the oulet slot of the gate. While the ticket is being conveyed, a ticket information reader 40 reads the information on the ticket and produces a corresponding output signal, which is applied through an amplifying and wave-shaping circuit 41 to a memorizing circuit 51, where the ticket information is memorized. A collation circuit 52 collates the ticket information with a valid ticket information memorized therein beforehand and if they are in conformity, produces an output to be applied to a collation memorizing circuit 53. The output from the circuit 53 is applied to a gate driving circuit 155, which receives another input from a passenger entrance detector 47. When the two inputs to the circuit 155 coincide, it produces an output to be applied as a drive signal to a gate mechanism 145 including the gate bars 15 and 25. Thus, when the ticket inserted into the inlet slot of the gate has been found valid and the passenger enters the gateway, the gate driving circuit 155 produces an output, which actuates the gate mechanism 145 to open the gate bars. On the contrary, if the inserted ticket has been found invalid or when the passenger has inserted no ticket at all, the gate mechanism is not operated so that the gate bars remain closed.

When the passenger actuates a passenger passage detector 46 such as the previously mentioned stepping plate type, the detector 46 produces an output, which is directly or indirectly through a logic circuit 124 applied to a gate restoring circuit 125, so that the gate bars are again projected across the gateway. If the detachable section has been dismounted from the ticket gate, with the switch 90 having been changed over to the side of the ticket insertion detector 42, the gate appears as if it were performing its proper functions completely. That is, when a ticket is inserted into the gate, whether the ticket be valid or invalid, the gate bars are opened to permit the passenger to pass through the gate. However, the gate bars remain closed when a passenger comes in without inserting any ticket into the inlet slot of the gate.

In the above embodiments, the detachable section 70 or 80 is adapted to be mounted onto a selected one of the gates included in the system. It may also be provided at a separate place such as a central station away from the ticket gates, with a switching means for selective connection of the detachable section to the ticket gates.

FIGS. 5 and 6 show such an arrangement. Here it is assumed that the ticket gates are of a normally open type as shown in FIG. 2 and the checking of passage of passengers is omitted.

In FIG. 5 the large blocks designated by Nos. 1, 2 . . . $n$ represent the fixed sections 72 provided in the gates, $n$ in number, under control of the central station. Each block 72 includes a ticket information reader 40, an amplifying and wave-shaping circuit 41, a ticket insertion detector 42, a ticket conveyer 43, a photosensor 44 and a gate mechanism 45 including a pair of gate bars 15 and 25. The numerals 161–16$n$ designate the output terminals of the amplifying and wave-shaping circuits 41 of the gates No. 1–No. $n$; the numerals 171–17$n$, the output terminals of the photosensors 44; and the numerals 181–18$n$, the input terminals of the gate mechanism 45.

A single detachable section 70, which is better called the central control here, is provided at a plate separate from the gates. The section or central control is provided with three rotary switches 116, 117 and 118, each having a single movable contact and a plurality of fixed contacts, $n$ in number. The movable contacts are ganged with one another. The fixed contacts 1–$n$ of the rotary switch 116 are connected to the output terminals 161–16$n$; the fixed contacts 1–$n$ of the rotary switch 117, to the output terminals 171–17$n$; and the fixed contacts 1–$n$ of the rotary switch 118, to the input terminals 181–18$n$. The movable contact of the rotary switch 116 is connected to the input terminal of the ticket information memorizing circuit 51 included in the central control 70; the movable contact of the switch 117, to the logic circuit 54; and the movable contact of the switch 118, to the output of the gate driving circuit 55.

Suppose that one of the gates, say No. 3 has been connected to the control 70 by means of the rotary switches 116, 117 and 118. Then the gate No. 3 only can operate as a perfect ticket gate, while the other gates appear as if they were checking the ticket information with respect to its validity. The rotary switches may be operated manually or automatically in accordance with a predetermined schedule or program.

FIGS. 7 and 8 are combined to show a system similar to that shown in FIGS. 5 and 6, but in FIGS. 7 and 8 the checking of passage of passengers is conducted, as in FIG. 3. In FIG. 7, No. 1–No. $n$ designate the fixed sections 82 provided in the gates, $n$ in number, under control of the central control station shown in FIG. 8. Each fixed section 82 include a ticket information reader 40, an amplifying and wave-shaping circuit 41, a ticket detector 42, a ticket conveyer 43, a collation memorizing circuit 53, a passenger entrance detector 47 including a photosensor 44 and a logic circuit 54, a gate driving circuit 55 and a gate mechanism 45. The numerals 261–26$n$ designate the output terminals of the circuits 41 of the gates No. 1–No. $n$, respectively; the numerals 271–27$n$, the terminals connected to the output of the ticket insertion detectors 42; and the numerals 281–28$n$, the input terminals of the collation memorizing circuits 53, respectively. The central control station includes a single control 80 (equivalent to the detachable section 80 in FIG. 3) comprising a ticket information memorizing circuit 51 and a collation circuit 52, and three rotary switches 226, 227 and 228 ganged with each other and each having a single movable contact and a plurality of fixed contacts 1–$n$. The fixed contacts of the switch 226 are connected to the terminals 261–26$n$, respectively. The fixed contacts of the switch 228 are connected to the terminals 228–28$n$, respectively and also to the terminals 271–27$n$ through normally closed contacts 471–47$n$, respectively. The fixed contacts of the rotary switch 227 are connected to solenoids 371–37$n$, respectively, for actuating the closed contacts 471–47$n$.

The movable contact of the rotary switch 226 is connected to the input of the information memorizing circuit 51; the movable contact of the rotary switch 228, to the output line of the collation circuit 52; and the movable contact of the rotary switch 227, to a source of electricity.

Suppose, for example, that the movable contacts of the three rotary switches are connected to the third fixed contacts thereof. Then the fixed section 82 of the gate No. 3 is connected to the central control 80, so that the gate No. 3 only performs its function perfectly. At this time although the contact 473 is opened by the relay 373 being energized, the other contacts 471, 472, 474–47$n$ remain closed, so that in the gates other than the gate No. 3 the gates bars are kept open for passengers who have inserted a ticket regardless of its validity or invalidity but closed against those without any ticket.

Figure 9:
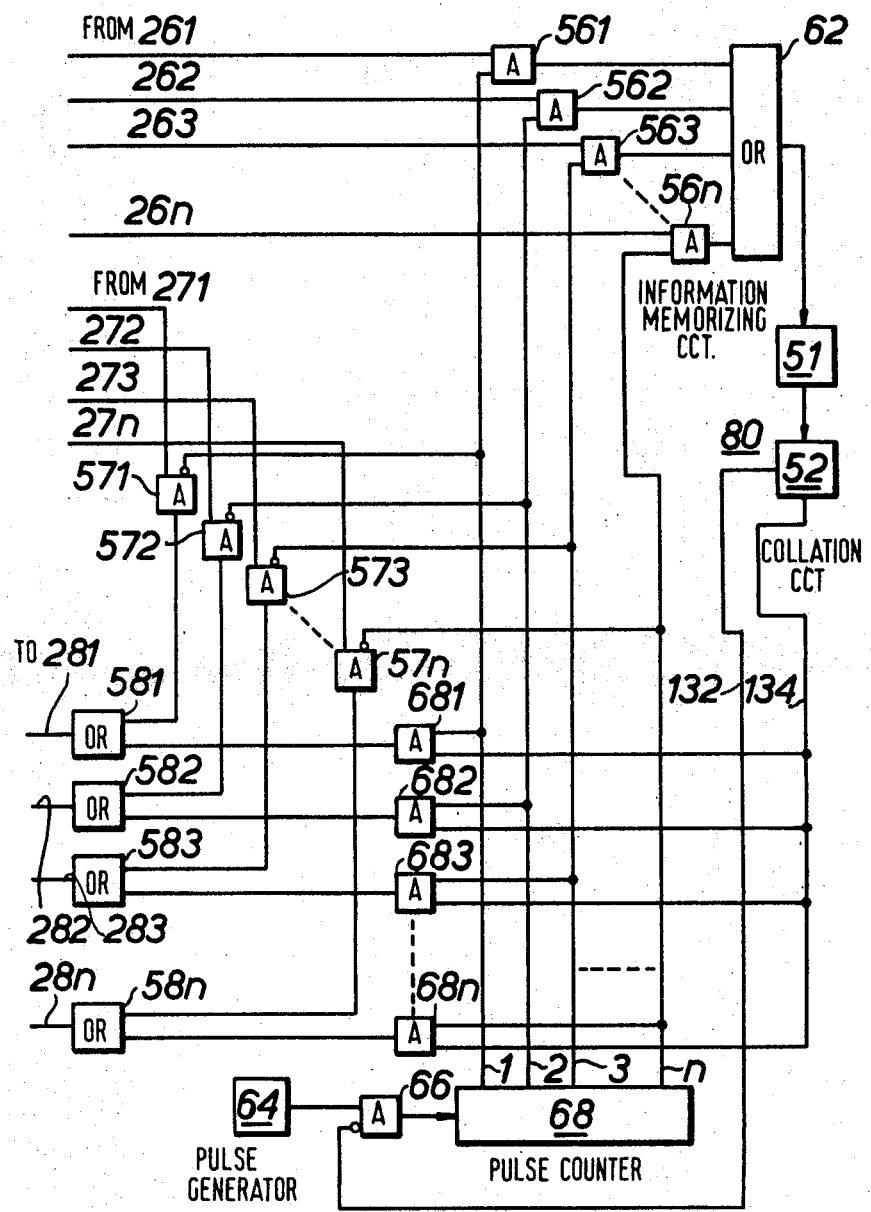

In the above embodiments, the rotary switches are manually operated. They may be automatically operated, and the selective connection of the gates to the central control may be made in a predetermined successive order or at random. FIG. 9 shows an arrangement for automatically changing the connection of the section 80 to the gates as shown in FIG. 7 in a predetermined successive order. In the central station, a pulse generator 64 produces a series of pulses, which are applied through an INHIBIT element 66 to a pulse counter 68 having the same number of output terminals 1–$n$ as the number of the gates to be controlled. The section 80 includes a ticket information memorizing circuit 51 and a collation circuit 52, just as in FIG. 8. The output from the collation circuit 52 is applied as an inhibit input to the INHIBIT element 66 through a line 132, whereupon the counter 68 stops its counting operation. When the output from the circuit 52 disappears, the counter 68 resumes its counting operation.

Each of the gates No. 1–No. $n$ includes the various component circuits as shown in FIG. 7 with three terminals 261, 271, 281; 262, 272, 282 . . . 26n, 27n, 28n. The terminals 261, 262 . . . 26n, at which the output from the ticket information reader 40 appears, are connected as one input to AND elements 561, 562 . . . 56n, respectively. The outputs at the terminals 1–n of the counter 68 are applied as the other input to the AND elements 561–56n, respectively. The outputs from the AND elements are applied through an OR elements 62 to the ticket information memorizing circuits 51, the output from which is applied to the collation circuit 52. The collation circuit 52 produces an output on a line 134 when the ticket information is valid and on the line 132 while the circuit 52 is in operation. The terminals 271–27n, at which the output from the ticket insertion detector 42 appears, are connected to the input terminals of INHIBIT elements 571–57n, respectively. The outputs at the terminals 1–n of the counter 68 are applied as the inhibit input to the INHIBIT elements 571–57n, respectively. The outputs from the INHIBIT elements 571–57n are applied through OR element 581–58n to the terminals 281–28n of the collation memorizing circuits 53 of the ticket gates No. 1–No. n, respectively.

The output on the line 134 from the collation circuit 52 is applied as one input to AND elements 681–68n, which receive as the other input the outputs at the terminals 1–n of the counter 68, respectively. The outputs from the AND elements 681–68n are applied through the OR elements 581–58n to the terminals 281–28n of the gates No. 1–No. n, respectively.

Suppose, for example, that the counter 68 now produces an output at the terminal 2. The INHIBIT element 572 produces no output even when a ticket has been inserted into the gate No. 2. However, the information on that ticket is read and checked with respect to its validity by the collation circuit 52, so that when it is found valid, the circuit 52 produces an output on the lines 132 and 134. The signal on the line 132 is applied as an inhibit input to the INHIBIT element 66 so that the counter 68 stops its counting operation, thereby maintaining the output at the terminal 2. Since it is only AND element 682 that receives one input from the terminal 2 at that time, the signal on the line 134 being applied as the other input to the AND element 682 causes this AND element to produce an output to be applied through the OR element 582 to the collation memorizing circuit 53 of the gate No. 2. This means that the gate No. 2 is checking the validity of the ticket inserted thereinto.

However, in the other gates, when a ticket has been inserted thereinto, the INHIBIT elements 571, 573–57n produce an output, which is applied through OR elements 581, 583–58n to the collation memorizing circuits 53 of these gates. This means that in the gates other than the gate No. 2, when a ticket has been inserted thereinto, no checking of the validity of the ticket information is conducted and the gate is kept opened regardless of the validity or invalidity of the inserted ticket.

When the checking operation of the ticket information has been finished in the gate No. 2, the signal on the line 132 and consequently the inhibit input to the INHIBIT element 66 disappears, so that the next pulse from the generator 64 causes the counter 68 to make one step forward, thereby shifting its output from the terminal 2 onto 3. With the output at the terminal 3 of the counter 68, the gate No. 3 performs its complete function for a predetermined period of time in a manner similar to that just mentioned above.

Figure 10:
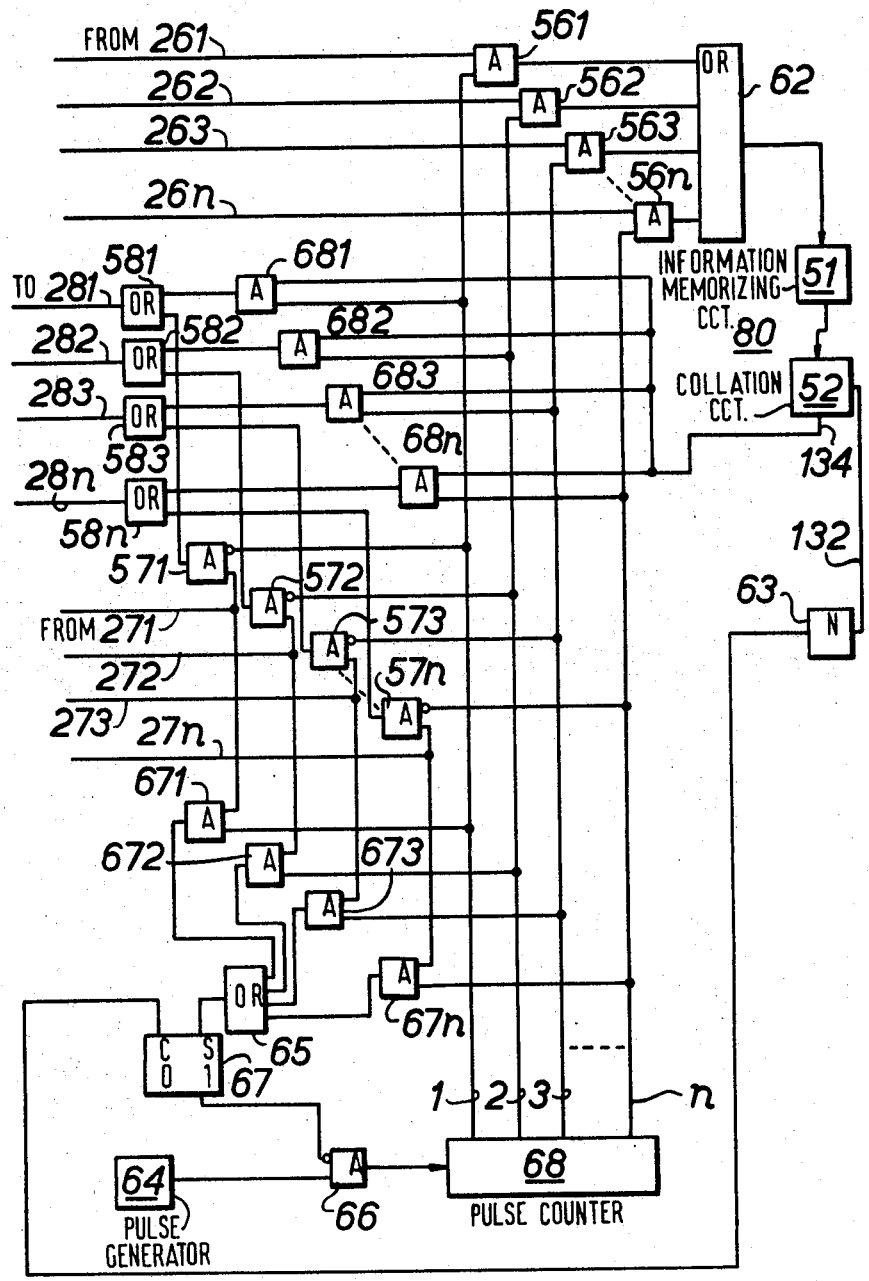

The arrangement of FIG. 9 is such that the section 80 is selectively connected to one of the gates after another in a predetermined successive order and for a predetermined period of time. FIG. 10 shows an arrangement that the connection between the section 80 and one of the gates is effected at random. FIG. 10 must be combined with FIG. 7 to form a complete system, and each gate is of a normally open type as shown in FIG. 3.

In FIG. 10, a pulse generator 64 produces a series of pulses at a considerably high frequency to be applied through an INHIBIT element 66 to a pulse counter 68 having the same number of output terminals 1–n as that of the ticket gates No. 1–No. n provided in the system. A flip-flop 67 applies an output to the inhibit terminal of the INHIBIT element 66. That is, when the flip-flop 67 is set, its set output is applied as an inhibit input to the INHIBIT element 66, so that the counter 68 is stopped, and when the flip-flop 67 is reset, the counter is started again.

The output terminals 261–26n of the gates No. 1–No. n (FIG. 7), at which the output from the ticket information reader 40 appears, are connected to one input terminal AND elements 561–56n, to the other input of which are applied to the outputs at the terminals 1–n of the counter 68. The outputs from the AND elements 561–56n are applied to the information memorizing circuit 51 through an OR element 62. The output from the circuit 51 is applied to a collation circuit 52. The circuit 52 produces an output on a line 134 when the ticket information has been found valid, and on a line 132 while the circuit 52 is in operation. The terminals 271–27n (FIG. 7), at which the output from the ticket insertion detector 42 appears, are connected as one input to AND elements 671–67n, respectively. The AND elements receive as the other input the outputs at the terminals 1–n of the counter 68. The outputs from the AND elements 671–67n are applied through an OR element 65 to the set input terminal of the flip-flop 67. The output line 132 from the collation circuit 52 is connected to a NOT element 63, the output from which is applied as a reset input to the flip-flop 67. The set output from the flip-flop 67 is applied as an inhibit input to the INHIBIT element 66. When there is no inhibit input to the element 66, the pulses from the generator 64 are applied to the counter 68 to make the same step forward, shifting its output successively from the terminal 1 through n. The outputs at the terminal 1–n are applied as one input to the AND elements 561–56n, respectively.

Suppose that the counter 68 has just shifted its output onto the terminal 2. Under the condition, wen the ticket detector 42 of the gate No. 2 happens to produce an output, the AND element 672 produces an output to set the flip-flop 67, whereupon the counter 68 is stopped, thereby keeping its output at the terminal 2. On the other hand, the ticket information read by the reader 40 is memorized in the circuit 51 through the line 262, the AND element 562 and the OR element 62, and when the ticket information is valid, the circuit 52 produces an output to be applied through the line 134 to the AND elements 681–68n. Among these AND elements, however, the element 682 only receives the other input from the output terminal 2 of the counter 68, so that it produces an output to be applied through an OR element 582 to the input terminal 282 of the gate No. 2 (FIG. 7). As a result, the passenger who inserted the valid ticket is permitted to pass through the gate.

The INHIBIT elements 571–57n receive an input from the ticket detector 42 of the corresponding gates through the terminals 271–27n, and an inhibit input from the output terminals 1–n of the counter 68. The outputs from the INHIBIT elements 571–57n are applied through OR elements 581–58n to the input terminals 281–28n of the gates No. 1–No. n When the gate No. 2 only is performing its proper function as a complete ticket gate, that is, checking the validity of the ticket inserted thereinto, the INHIBIT element 572 receives an inhibit input, as previously mentioned, but the other INHIBIT elements 571, 573–57n receive no inhibit input, so that the gates No. 1, No. 3–No. n do not perform their proper function as a complete ticket gate, that is, the tickets inserted thereinto are not checked with respect to their validity.

When the checking of the ticket inserted has been finished in the circuit 52, the output on the line 132 disappears, so that the NOT element 63 produces an output to reset the flip-flop 67. Consequently, the inhibit input that has until then been applied to the INHIBIT element 66 is removed, so that the counter 68 resumes its counting operation.

Having illustrated and described preferred embodiments of the invention, it is understood that they are merely representative and that there are many modifications and changes thereof within the scope of the invention as defined in the appended claims. For example, the system of FIG. 10 may be modified so that the checking of passage of passengers is omitted; and the systems of FIGS. 8, 9 and FIG. 10 may be adapted to control the normally closed type of gates as shown in FIG. 4. The systems of the invention may be applied not only to the normally open or closed type of gates but also any other types. The invention may be applied to exit gates as well as entrance gates.

What I claim is:

1. A system for automatically examining railway tickets or the like each having a coded information recorded thereon, comprising: a plurality of ticket gates, each gate having means for reading the information of the ticket a passenger has used in the gate and means for opening and closing the gate; and means detachably mountable onto a selected one of said ticket gates to cooperate with said reading means of said selected ticket gate to examine the ticket information read by said reading means; whereby said gate opening and closing means of said selected ticket gate is operated so as to permit passage therethrough only when the ticket information read by said reading means has been found valid, while the gate opening and closing means of the other gates are conditioned to permit passage therethrough regardless of the validity or invalidity of the ticket used therein.

2. The system of claim 1, wherein said ticket examining means comprises means for memorizing the ticket information read by said reading means and means for checking the validity of the ticket information memorized in said memorizing means.

3. The system of claim 1, wherein said detachably mountable means includes means for controlling said gate opening and closing means so that in said selected one gate, the gate opening and closing means is operated to permit passage through said gate only when the ticket information read by said reading means has been found valid, while in the other gates, the gate opening and closing means are conditioned to permit passage therethrough regardless of the validity or invalidity of the ticket used therein.

4. The system of claim 1, wherein said detachably mountable means is formed into a cartridge.

5. The system of claim 1, further including means for causing the gate opening and closing means of said other gates to be conditioned not to permit passage therethrough when no ticket has been used.

6. The system of claim 1, wherein each said ticket gate includes means for controlling said gate opening and closing means so that in said selected one gate, the gate opening and closing means is operated to permit passage through the gate only when the ticket information read by said reading means has been found valid, while in the other gates, the gate opening and closing means are conditioned to permit passage therethrough regardless of the validity or invalidity of the ticket.

7. The system of claim 1, wherein each said gate is of a normally open type.

8. The system of claim 1, wherein each said gate is of a normally closed type.

9. The system of claim 1, further including first switching means for selectively connecting the reading means of one of said gates to said ticket information examining means, and second switching means ganged with said first switching means for connecting said ticket information examining means to the gate opening and closing means of said selected one gate.

10. The system of claim 9, wherein said first and second switching means are operated so that the selective connection of said ticket information examining means to one of said ticket gates after another is effected in a predetermined order.

11. The system of claim 9, wherein said first and second switching means are operated so that the selective connection of said ticket information examining means to one of said ticket gates is effected at random.

References Cited

UNITED STATES PATENTS

| | | | |
|---|---|---|---|
| 3,015,087 | 12/1961 | O'Gorman | 340—149 |
| 3,229,074 | 1/1966 | Harrington | 340—149X |

DONALD J. YUSKO Primary Examiner